United States Patent [19]
Juodikis

[11] 3,946,252
[45] Mar. 23, 1976

[54] INTEGRAL CYCLE POWER CONTROLLER
[75] Inventor: Peter Juodikis, Chicago, Ill.
[73] Assignee: GCA Corporation, Bedford, Mass.
[22] Filed: Sept. 23, 1974
[21] Appl. No.: 508,538

[52] U.S. Cl. ............ 307/252 B; 307/252 N; 323/18
[51] Int. Cl.² ........................................ H03K 17/72
[58] Field of Search ........ 307/252 B, 252 N, 252 Q, 307/252 T; 323/22 SC, 18

[56] References Cited
UNITED STATES PATENTS

| | | |
|---|---|---|
| 3,360,713 | 12/1967 | Howell ............................ 307/252 B |
| 3,446,991 | 5/1969 | Howell ............................ 307/252 B |
| 3,526,790 | 9/1970 | Brookmire ...................... 307/252 B |
| 3,708,696 | 1/1973 | Lorenz ............................ 307/252 B |

Primary Examiner—John Zazworsky
Attorney, Agent, or Firm—Kenway & Jenney

[57] ABSTRACT

In the power controller disclosed herein, a load is energized from an a.c. line through a triac. When the triac is triggered on an a.c. half-cycle of one polarity, a capacitor is charged while the load is energized. The capacitor is interconnected with the gate circuit of the triac through an SCR and the charging circuit for the capacitor is arranged so as to trigger the SCR on the a.c. half-cycle following a half-cycle during which the capacitor was charged. Thus, the triac is selectively triggered on alternating half-cycles and integral cycle energization of the load is obtained.

2 Claims, 1 Drawing Figure

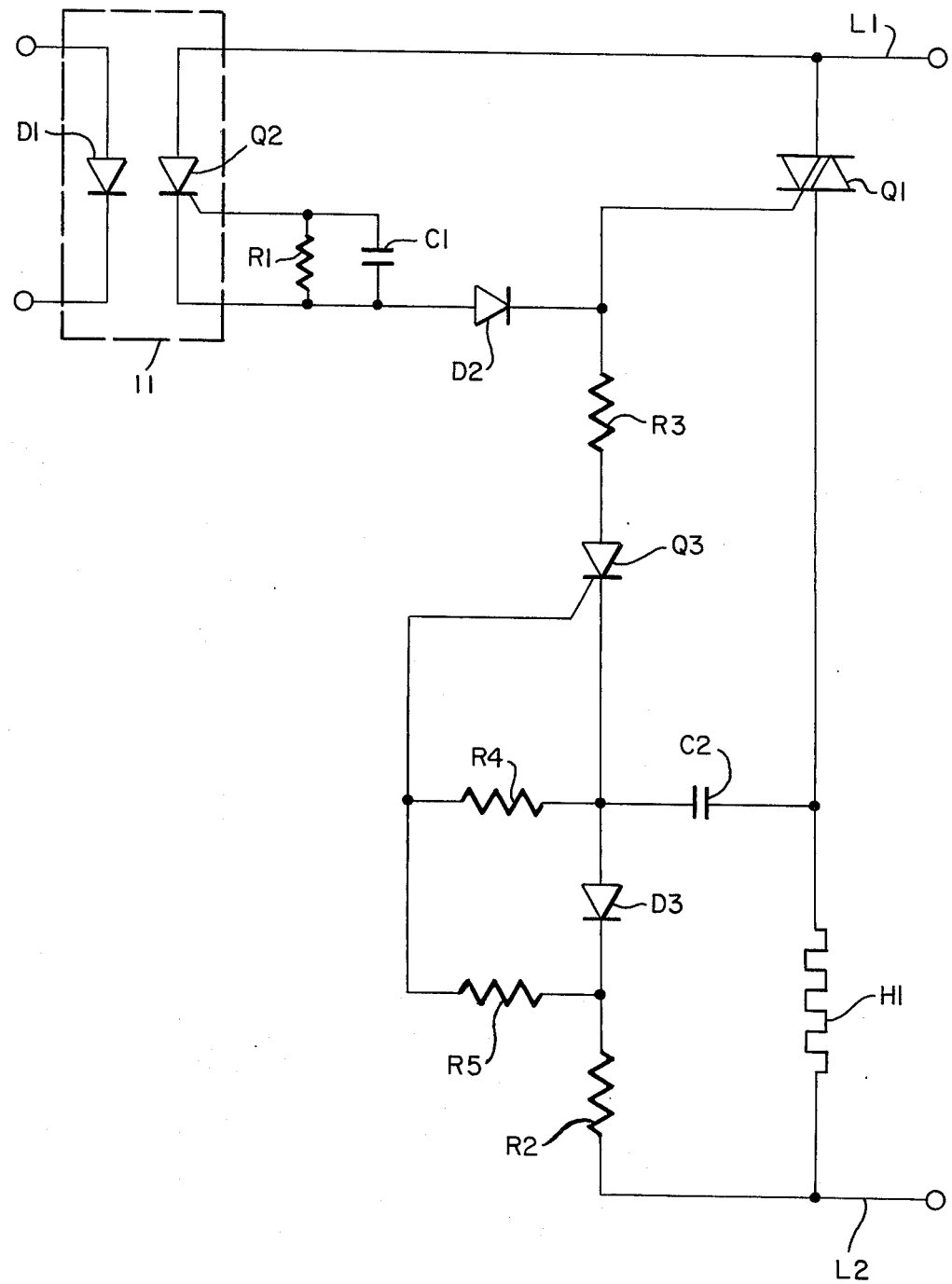

INTEGRAL CYCLE POWER CONTROLLER

BACKGROUND OF THE INVENTION

The present invention relates to a semiconductor a.c. power controller and more particularly to such a controller providing integral cycle energization of a load from an a.c. supply line.

Various integral cycle semiconductor power controllers have been devised heretofore. Representative examples are those disclosed in U.S. Pat. Nos. 3,495,098 and 3,727,080. Objects of the present invention are to provide a controller of improved sensitivity, stability and reliability, particularly in terms of always providing integral cycle rather than half-cycle energization; to provide a power controller which itself dissipates very little power; and to provide such a power controller which is of relatively simple and inexpensive construction. Other objects and features will be in part apparent and in part pointed out hereinafter.

SUMMARY OF THE INVENTION

Briefly, a power controller in accordance with the present invention is operative to selectively energize a load from an a.c. supply line and to provide integral cycle energization of the load. A four-quadrant semiconductor power switching device is connected in series with the load across the a.c. supply line and means are provided for selectively triggering the device on those a.c. half-cycles when the line voltage is of a first polarity. Circuit means are provided for charging a capacitor when the load is energized on the first polarity a.c. half-cycles and the capacitor is interconnected, through a semiconductor current switching device. The charging circuit includes means for energizing the current switching device on the a.c. half-cycle following any half-cycle during which the capacitor is charged. Accordingly, the power switching device is triggered on alternate half-cycles of opposite polarity.

BRIEF DESCRIPTION OF THE DRAWING

The single FIGURE is a schematic circuit diagram of a power controller in accordance with the present invention.

DESCRIPTION OF THE PREFERRED EMBODIMENT

Referring now to the drawing, the power controller circuit shown there is arranged for use in a temperature controller, that is, to control the energization of a heater H1 from a.c. power mains L1 and L2. While it is desirable to be able to turn the heater H1 on and off very rapidly so as to closely control temperature by duty cycle modulation of the average power input to the heater, it is also desirable that the heater be energized on an integral a.c. cycle basis. By integral cycle energization is meant a balanced or symmetrical energization, i.e. a form of energization in which any period of energization always comprises an even number of a.c. half-cycles. As is understood, integral cycle energization avoids the drawing of a d.c. component from a.c. supply lines, a desirable attribute since the presence of a substantial d.c. component can cause overheating of line transformers and other undesirable effects.

Heater H1 is connected in series with a triac Q1 across the a.c. supply leads. As is understood, triac Q1 is a fourquadrant semiconductor power switching device, that is, a device which will conduct, through its power circuit, in either direction and can be triggered into conduction in either direction by pulses of either polarity applied to its gate circuit.

On those a.c. half-cycles when the lead L1 is positive with respect to lead L2, the triac Q1 may be selectively triggered into conduction by pulses coupled to the gate circuit of triac Q1 through an opto-isolator 11. Opto-isolator 11 includes a lightemitting diode D1 and a light-sensitive SCR Q2. The gate circuit of SCR Q2 is normally biased off by a resistor R1 shunted by a capacitor C1 but may be triggered into conduction by energization of the light-emitting diode D1. The SCR Q2 is connected from the supply lead L1 to the gate circuit of triac Q1 through an isolating diode D2 so as to be able to selectively trigger the triac into conduction when the SCR Q2 is triggered.

In the temperature control environment in which the controller shown is assumed to operate, the light-emitting diode is assumed to be energized by a conventional temperature measuring bridge controlling a zero-crossing detector to selectively generate control pulses when additional heat is needed, the pulses being synchronized with the zero-crossing points of the a.c. supply voltage. Such temperature control circuits and zero-crossing detectors are conventional and hence are not described in detail herein.

When the triac Q1 is triggered during a positive half-cycle by a pulse coupled to the opto-isolator 11, the heater H1 is thereby energized during that half-cycle. A capacitor Q2 is connected across or in parallel with the heater through a circuit which includes a diode D3 and a resistor R2, the diode being oriented so that the capacitor C2 is charged if the triac Q1 conducts during a positive half-cycle.

Capacitor C2 is also connected, through an SCR Q3 and a current-limiting resistor R3, to the gate circuit of the power triac Q1. Conduction through the SCR Q3 is controlled by the capacitor charging circuit, a portion of the voltage appearing across diode D3 being applied to the gate circuit of SCR Q3 by means of a voltage divider comprising a pair of resistors R4 and R5. On those a.c. half-cycles when the capacitor C2 is being charged, the forward voltage drop across the diode D3 reverse-biases the gate circuit of the SCR Q3, assuring that the SCR will not conduct. As the next a.c. half-cycle starts, however, the charged capacitor C2 causes a substantial reverse voltage to appear across the diode D3 which causes the gate circuit of SCR Q3 to be forward biased, triggering the SCR into conduction. The charge on capacitor C2 is then conducted through the anodecathode circuit of the triac Q1, triggering the triac into conduction and thereby energizing the heater H1. As may be seen, this operation occurs on any negative half-cycle following a positive half-cycle during which the triac Q1 was triggered through the opto-isolator 11. It may thus be seen that integral cycle operation is obtained in which the triac Q1 will always be triggered on the alternate or negative half-cycles following triggering during a positive half-cycle.

Reliability of the present circuit is enhanced by the fact that the triggering pulse applied through the SCR Q3 drives the triac gate negative, even though the lead L1 is negative with respect to the lead L2. The triac Q1 is thus triggered in the so-called third quadrant of the conventionally defined four possible quadrants of operation. As is understood, the third quadrant is substantially more sensitive than the fourth quadrant in which operation is typically provided by the many prior art circuits. Further, since the controller of the present invention utilizes the additional gain and abrupt triggering operation provided by the SCR Q3, the capacitor C2 does not need to hold a particularly large charge. Thus, the power dissipated in the controller itself, mainly in the resistor R2, may be reduced by employing relatively high values of resistance for that resistor through which the capacitor C2 is charged.

In one particular embodiment of the invention, the following device types and values were utilized and highly stable and reliable operation was obtained in accordance with the objects and advantages discussed above, utilizing standard 110 volt 60 cycles a.c. power.

| | |
|---|---|
| Triac Q1 | RCA 40719 |
| SCR Q3 | G.E. C-106-D1 |
| D2 | 1N 5060 |
| D3 | 1N 4148 |
| R1 | 39,000 ohms |
| R2 | 10,000 ohms |
| R3 | 330 ohms |
| R4 | 820 ohms |
| R5 | 330 ohms |
| C1 | 200 picofarads |
| C2 | 2 microfarads |
| H1 | up to 10 amps |
| Opto-isolator | Monsanto MCS 2-400 |

In view of the foregoing, it may be seen that several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

What is claimed is:

1. A power controller for selectively energizing a load from an a.c. supply line and providing integral cycle energization of the load, said controller comprising:

a triac connected in series with the load across the a.c. supply line;

means for selectively triggering said triac on those a.c. halfcycles when the line voltage is of a first polarity, the triac being oriented to be triggered in its first quadrant;

a capacitor, one side of which is connected to a junction between the series-connected triac and load;

circuit means including a diode and a current limiting resistor connecting the other side of said capacitor to the load side of the a.c. supply line for charging said capacitor when said load is energized on said a.c. half-cycles of first polarity; an SCR, the cathode of which is connected to a junction between said diode and said capacitor and the anode of which is connected to the gate of said triac; and means for applying the voltage developed across said diode to the gate-cathode circuit of said SCR thereby to trigger said SCR on the half-cycle following a half-cycle of said first polarity during which said triac is triggered, whereby said capacitor is discharged through the anode-cathode circuit of said SCR into the gate of said triac and said triac is triggered in its third quadrant to provide integral cycle energization of the load.

2. A power controller as set forth in claim 1 wherein the diode voltage is applied to the gate-cathode circuit of said SCR by a resistive voltage divider.

* * * * *